United States Patent
Okuda et al.

(10) Patent No.: US 6,483,430 B2
(45) Date of Patent: Nov. 19, 2002

(54) TURN-SIGNAL AUTOMATIC CANCELLATION APPARATUS

(75) Inventors: Takeo Okuda, Niwa-gun (JP); Masashi Hashimoto, Niwa-gun (JP); Yoshinori Ito, Niwa-gun (JP); Minoru Morikawa, Niwa-gun (JP)

(73) Assignee: Kabushiki Kaisha Tokai-Rika-Denki-Seisakusho, Niwa-gun (JP)

( * ) Notice: Subject to any disclaimer, the term of this patent is extended or adjusted under 35 U.S.C. 154(b) by 0 days.

(21) Appl. No.: 09/899,181

(22) Filed: Jul. 6, 2001

(65) Prior Publication Data

US 2002/0024434 A1 Feb. 28, 2002

(30) Foreign Application Priority Data

Jul. 11, 2000 (JP) ........................................ 2000-209841

(51) Int. Cl.[7] ................................................. B60Q 1/40
(52) U.S. Cl. ....................................... 340/476; 340/475
(58) Field of Search ................................ 340/476, 475, 340/477

(56) References Cited

U.S. PATENT DOCUMENTS

| 4,403,211 A | * | 9/1983 | Shibata et al. | ............... 340/476 |
| 4,638,290 A | * | 1/1987 | Wagner | ...................... 340/476 |
| 4,792,785 A | * | 12/1988 | Yukio et al. | ................. 340/476 |
| 5,260,685 A | * | 11/1993 | Parker | ........................ 340/477 |

FOREIGN PATENT DOCUMENTS

| JP | 05319169 | * | 3/1993 |
| JP | 5-319169 A | | 12/1993 |

\* cited by examiner

*Primary Examiner*—Julie Lieu
(74) *Attorney, Agent, or Firm*—Oliff & Berridge, PLC

(57) ABSTRACT

A control circuit generates a right-turn or left-turn signal from a direction indicator lamp based on a direction indicating signal from a turn signal switch in a scooter as a vehicle. The control circuit then calculates a turning angle of the scooter from an angular speed V of the scooter detected by an angular speed sensor, and cancels the turn signal generated from the direction indicator lamp on the condition that the turning angle be equal to or greater than a reference turning angle, that a vehicle speed N detected by a vehicle speed sensor be equal to or higher than a reference vehicle speed, and that the angular speed detected by the angular speed sensor be equal to or lower than a reference angular speed. Accordingly, even when the scooter is waiting to make a right or left turn at an intersection with a turning angle equal to or greater than the reference turning angle and an angular speed V equal to or lower than the reference angular speed, the vehicle speed N does not become equal to or higher than the reference vehicle speed (the vehicle speed is actually zero). Therefore, the turn signal is prevented from being canceled unnecessarily.

19 Claims, 3 Drawing Sheets

TURN-SIGNAL AUTOMATIC CANCELLATION APPARATUS

INCORPORATION BY REFERENCE

The disclosure of Japanese Patent Application Laid-Open No. 2000-209841 filed on Jul. 11, 2000 including the specification, drawings and abstract is incorporated herein by reference in its entirety.

BACKGROUND OF THE INVENTION

1. Field of the Invention

The invention relates to a turn-signal automatic cancellation apparatus for canceling a turn signal as soon as a vehicle has almost completed its turn.

2. Description of Related Art

A turn-signal automatic cancellation apparatus for vehicles is disclosed e.g. in Japanese Patent Application Laid-Open No. HEI 5-319169. This apparatus is provided with a control portion for generating a right-turn or left-turn signal by blinking a direction indicator lamp based on a signal from a direction selecting switch (turn signal switch), and with an angular speed sensor for detecting an angular speed of a vehicle. The control portion calculates a turning angle of the vehicle by integrating the angular speed detected by the angular speed sensor and automatically cancels the turn signal generated from the direction indicator lamp on the condition that the turning angle be greater than a reference turning angle and that the angular speed detected by the angular speed sensor be lower than a reference angular speed.

In the above construction, however, if the vehicle has come to a halt at the center of an intersection to allow the passage of oncoming vehicles while attempting to make a right turn, i.e., has been waiting to make a right turn, the turning of the vehicle has been made by half by this moment with its turning angle greater than the reference turning angle and with its angular speed equal to zero (which is lower than the reference angular speed) due to a halt of the vehicle. Therefore, the vehicle suffers an inconvenience of unnecessary cancellation of a turn signal while being at a halt at the center of the intersection.

By the same token, if the vehicle has come to a halt to allow pedestrians to walk across a crosswalk while attempting to make a left turn, i.e., has been waiting to make a left turn, the turning of the vehicle has been made by half by this moment with its turning angle greater than the reference turning angle and with its angular speed equal to zero (which is lower than the reference angular speed) due to a halt of the vehicle. Therefore, the vehicle suffers an inconvenience of unnecessary cancellation of a turn signal while making a left turn.

SUMMARY OF THE INVENTION

It is an object of the invention to provide a turn-signal automatic cancellation apparatus capable of preventing a turn signal indicative of a turning direction of a vehicle from being canceled unnecessarily.

A turn-signal automatic cancellation apparatus according to one aspect of the invention comprises a controller for generating a turn signal from a direction indicator lamp based on a direction indicating signal from a turn signal switch, an angular speed sensor for detecting an angular speed of a vehicle, and a vehicle speed sensor for detecting a speed of the vehicle. The controller calculates a turning angle of the vehicle from the angular speed detected by the angular speed sensor and cancels the turn signal generated from the direction indicator lamp on the condition that the calculated turning angle be equal to or greater than a reference turning angle, that the vehicle speed detected by the vehicle speed sensor be equal to or higher than a reference vehicle speed, and that the angular speed detected by the angular speed sensor be equal to or lower than a reference angular speed.

According to such a construction, the turn signal is canceled on condition that the turning angle of the vehicle be equal to or greater than the reference turning angle, that the vehicle speed detected by the vehicle speed sensor be equal to or higher than the reference vehicle speed, and that the angular speed detected by the angular speed sensor be equal to or lower than the reference angular speed. Therefore, even if the turning angle of the vehicle is equal to or greater than the reference turning angle and the angular speed detected by the angular speed sensor is equal to or lower than the reference angular speed while the vehicle is waiting to make a right or left turn, the vehicle speed detected by the vehicle speed sensor does not become equal to or higher than the reference vehicle speed (the vehicle speed is actually zero). Thus, the turn signal is prevented from being canceled unnecessarily.

In the above aspect of the invention, the controller may calculate a-turning angle if the angular speed detected by the angular speed sensor is equal to or higher than a set angular speed.

According to such a construction, the controller calculates a turning angle if the angular speed detected by the angular speed sensor is equal to or higher than the set angular speed. Thus, if the vehicle is about to make a right or left turn at an intersection after having passed a road making a gentle curve while generating a turn signal from the direction indicator lamp, the angular speed detected by the angular speed sensor during the passage of the vehicle along the gentle curve is not calculated as the turning angle of the vehicle. Therefore, the turn signal can be prevented from being canceled while making a right or left turn or from remaining uncanceled after completion of a right or left turn.

DETAILED DESCRIPTION OF PREFERRED EMBODIMENT

Hereinafter, one embodiment of the invention that has been applied to a scooter as a vehicle will be described with reference to the drawings.

Figure 1:
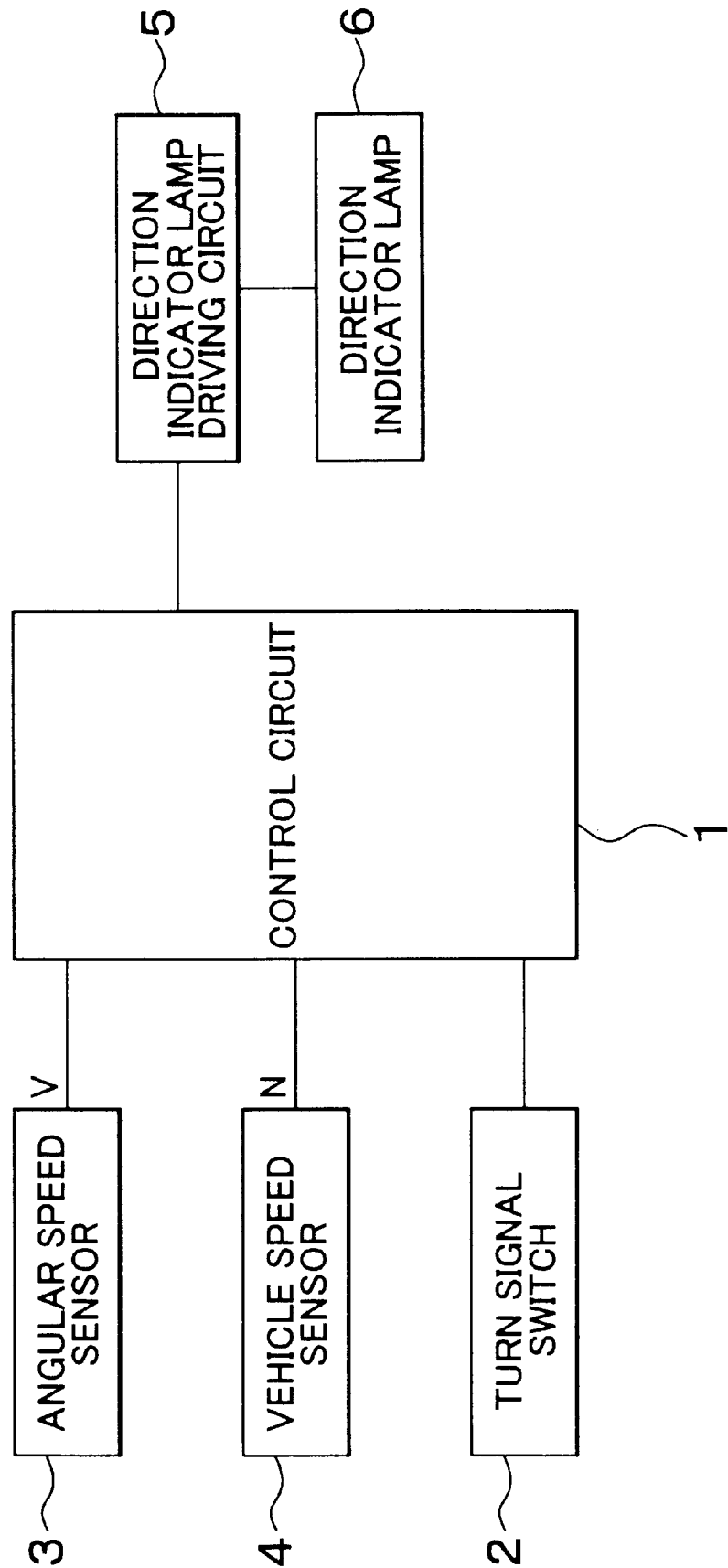
FIG. 1 is a block diagram showing an electrical construction according to one embodiment of the invention.

FIG. 1 is a block diagram showing an electrical construction of a turn-signal automatic cancellation apparatus. Referring to FIG. 1, a control circuit 1 as a control means installed in the scooter is mainly constructed of a microcomputer having input terminals with which a turn-signal switch 2, an angular speed sensor 3 and a vehicle speed sensor 4 are connected.

The turn-signal switch 2 outputs a right-turn or left-turn direction indicating signal, in accordance with operation of an operation lever disposed on a handle of the scooter. In this case, if the operation lever of the turn-signal switch 2 has been shifted to its right-turn or left-turn position from its neutral position and then released, it automatically returns to its neutral position. The angular speed sensor 3 is constructed of a gyro and detects an angular speed of the scooter during its turn. In this case, the angular speed sensor 3 actually outputs an angular speed as a voltage, which, for example, assumes a positive value while the scooter is making a right turn and a negative value while the scooter is making a left turn. The vehicle speed sensor 4 detects a speed of the scooter.

The control circuit 1 is connected at an output terminal thereof with a direction indicator lamp driving circuit 5 at an input terminal thereof. The direction indicator lamp driving circuit 5 is connected at an output terminal thereof with a direction indicator lamp 6. In this case, the direction indicator lamp 6 is actually composed of front and rear right-turn indicator lamps and front and rear left-turn indicator lamps.

Next, operation of this embodiment will be described referring also to a flowchart shown in FIG. 2. Upon activation (start) of the control circuit 1, the control circuit 1 first of all proceeds to a determination step S1 of determining "whether or not there is any direction indicating signal?". In the step S1, the control circuit 1 determines whether or not a right-turn or left-turn signal has been supplied from the turn-signal switch 2. If the result in the step S1 is "NO" (there is no signal), the control circuit 1 repeats the determination step S1. If the result in the step S1 is "YES" (there is a signal), the control circuit 1 proceeds to a processing step S2 where the direction indicator lamp driving circuit 5 is supplied with a right-turn or left-turn driving signal based on a right-turn or left-turn direction indicating signal supplied from the turn-signal switch 2. Thereby the direction indicator lamp driving circuit 5 blinks the right-turn or left-turn indicator lamps of the direction indicator lamp 6 based on the right-turn or left-turn driving signal, and thus causes the right-turn or left-turn indicator lamps to generate a right-turn or left-turn signal.

Hence, if a driver of the scooter has entered an intersection and turned the handle e.g. to the right to make a right turn, the angular speed sensor 3 detects an angular speed V and outputs it as a voltage signal. Thereafter the control circuit 1 proceeds to a processing step S3 of "reading the angular speed V". The control circuit 1 reads the angular speed detected by the angular speed sensor 3 in the step 3 and then proceeds to a determination step S4 of "$V \geq Va$?". In the determination step S4, the control circuit 1 determines whether or not the angular speed V read in the processing step S3 is equal to or higher than a reference angular speed Va. If the result in the step S4 is "NO" (V<Va), the control circuit 1 repeats the processing step S3 and the determination step S4. If the angular speed V has become equal to or higher than the reference angular speed Va and the result in the determination step S4 has turned out to be "YES", the control circuit 1 proceeds to a processing step S5 of "calculating a turning angle θ (through integration)" and calculates a turning angle θ of the scooter by integrating the angular speed V read in the processing step S3.

The processing step S3, the determination step S4 and the processing step S5 performed by the control circuit 1 as described above are also applicable to a case where the driver of the scooter has entered an intersection and turned the handle to the left to make a left turn.

The control circuit 1 then proceeds to a determination step S6 of "$\theta \geq \theta s$?" and determines whether or not the turning angle θ calculated in the processing step S5 is equal to or greater than a reference turning angle θs (e.g. 30 to 45 degrees). If the result in the determination step S6 is "NO" (θ<θs), the control circuit 1 returns to the processing step S3 and then repeats the processing step S3, the determination step S4, the processing step S5 and the processing step S6. If the scooter has turned by half and then the turning angle θ has become equal to or greater than the reference turning angle θs, the control circuit 1 makes an "YES" determination in the determination step S6, proceeds to a processing step S7 of "reading a vehicle speed N", and reads a speed of the scooter detected by the vehicle speed sensor 4, i.e., a vehicle speed N.

The control circuit 1 then proceeds to a determination step S8 of "$N \geq Ns$?" and determines whether or not the vehicle speed N read in the processing step S7 is equal to or higher than a reference vehicle speed Ns (e.g. 15 to 20 km/h). For example, if the scooter has come to a halt waiting to make a right or left turn, the vehicle speed N is zero. Therefore, the control circuit 1 makes a "NO" determination in the determination step S8 and returns to the processing step S7. If the scooter has started again after having waited to make a right or left turn or passed the intersection without waiting to make a right or left turn, the vehicle speed N is equal to or higher than the reference vehicle speed Ns. Therefore, the control circuit 1 makes an "YES" determination in the determination step S8, proceeds to a processing step S9 of "reading an angular speed V", reads again an angular speed V detected by the angular speed sensor 3, and then proceeds to a determination step S10 of "$V \leq Vs$?".

In the determination step S10, the control circuit 1 determines whether or not the angular speed V read in the processing step S9 is equal to or lower than a reference angular speed Vs (N.B. Vs<Va). In this case, if the scooter has not completed its turn, the angular speed V is higher than the reference angular speed Vs. Therefore, the control circuit 1 makes a "NO" determination in the determination step S10 and returns to the processing step S7. Then if the scooter has almost completed its turn, the angular speed V is equal to or lower than the reference angular speed Vs. Therefore, the control circuit 1 makes an "YES" determination in the determination step S10, proceeds to a processing step S11 of "turning off direction indicator lamp", and stops a right-turn or left-turn driving signal from being outputted to the direction indicator lamp driving circuit 5. Accordingly, the direction indicator lamp driving circuit 5 stops the right-turn or left-turn indicator lamps of the direction indicator lamp 6 from blinking, and thus cancels a turn signal. Thereafter the control circuit 1 returns to the determination step S1.

As described above, according to this embodiment, the control circuit 1 stops the right-turn or left-turn indicator lamps of the direction indicator lamp 6 from blinking and cancels a turn signal on the condition that the turning angle θ obtained by integrating the angular speed V detected by the angular speed sensor 3 be equal to or higher than the reference turning angle θs (that the turning of the scooter has been carried out reliably), that the vehicle speed N detected by the vehicle speed sensor 4 be equal to or higher than the reference vehicle speed Ns (that the scooter has not come to a halt), and that the angular speed V detected by the angular speed sensor 3 be equal to or lower than the reference angular speed Vs (that the scooter has almost completed its turn). Thus, it is possible to prevent a turn signal from being cancelled unnecessarily while the scooter is waiting to make a right or left turn.

Further, according to this embodiment, since the reference turning angle θs is set e.g. as 30 to 45 degrees, the turning angle θ does not reach the reference turning angle θs while the scooter is changing lanes. Thus, a turn signal is not cancelled unnecessarily while the scooter is changing lanes.

Now description will be made as to a case where the scooter makes a right turn C or a left turn D at an intersection B while driving on a road A making a gentle right-hand curve. In this case, as a matter of course, the driver turns the operation lever of the handle of the scooter to the right or left in making a right or left turn while driving on the road A. Therefore, the right-turn or left-turn indicator lamps of the direction indicator lamp 6 generate a turn signal, and the angular speed sensor 3 detects the angular speed V.

Accordingly, if the turning angle θ is obtained by reading and integrating the angular speed V while the scooter is driving on the road A making such a gentle curve, the turn signal may be canceled before completion of a right turn e.g. in the case where the scooter enters the intersection B to make a right turn. On the contrary, in the case where the scooter enters the intersection B to make a left turn, the voltage signal indicative of the angular speed V detected by the angular speed sensor 3 assumes a positive value when the scooter is driving on a right-hand curve and assumes a negative value when the scooter is making a left turn. Thus, the integrated value (positive) of the angular speed V when the scooter is driving on the right-hand curve counterbalances the turning angle 6 (negative) as the integrated value of the angular speed V when the scooter is making a left turn. The turn signal may not be canceled even after the scooter has made a left turn.

Problems as described above may also occur when making a left or right turn at an intersection on a road making a gentle left-hand curve.

On the other hand, according to this embodiment, the control circuit 1 determines in the determination step S4 whether or not the angular speed V detected by the angular speed sensor 3 is equal to or greater than a set angular speed Va (Va>Vs), and returns to the processing step S3 without proceeding to the processing step S5 of "calculating the turning angle θ (through integration)" if the result in the step S4 is "NO" (V<Va). Therefore, a turn signal is prevented from being canceled while making a right or left turn or from remaining uncanceled after completion of a right or left turn.

Note that the invention should not be limited to the above embodiment shown in the drawings but can be modified and extended as follows.

Although the reference turning angle θs is set e.g. as 30 to 45 degrees in the above embodiment, it may be set e.g. as 15 degrees. In such a construction, the control circuit 1 detects that the scooter has begun making a turn, and can reliably cancel a turn signal e.g. even in making a relatively gentle right or left turn at a Y-shaped intersection.

Figure 2:
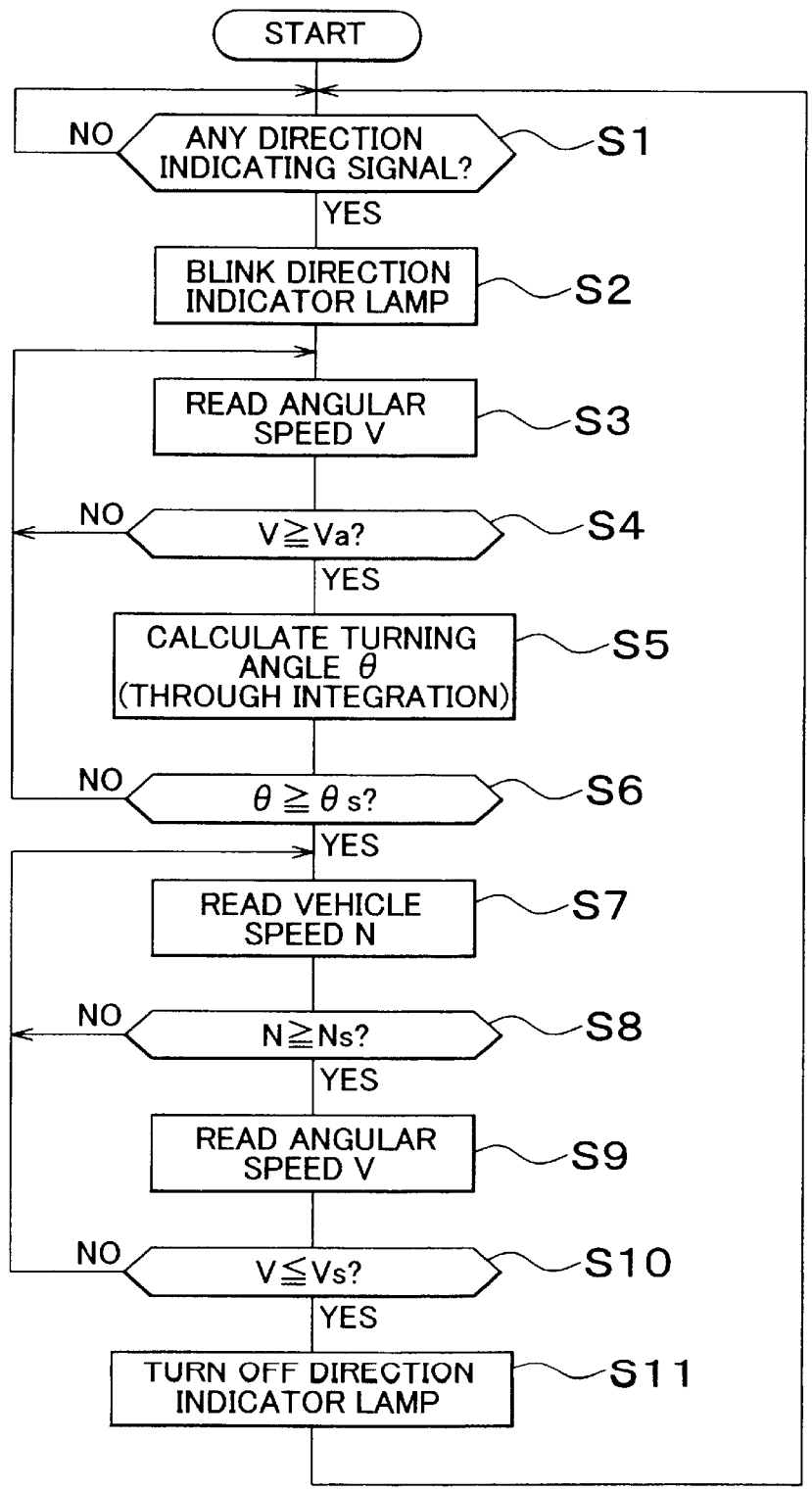
FIG. 2 is a flowchart showing control processings performed by a control circuit according to one embodiment of the invention.
Figure 3:
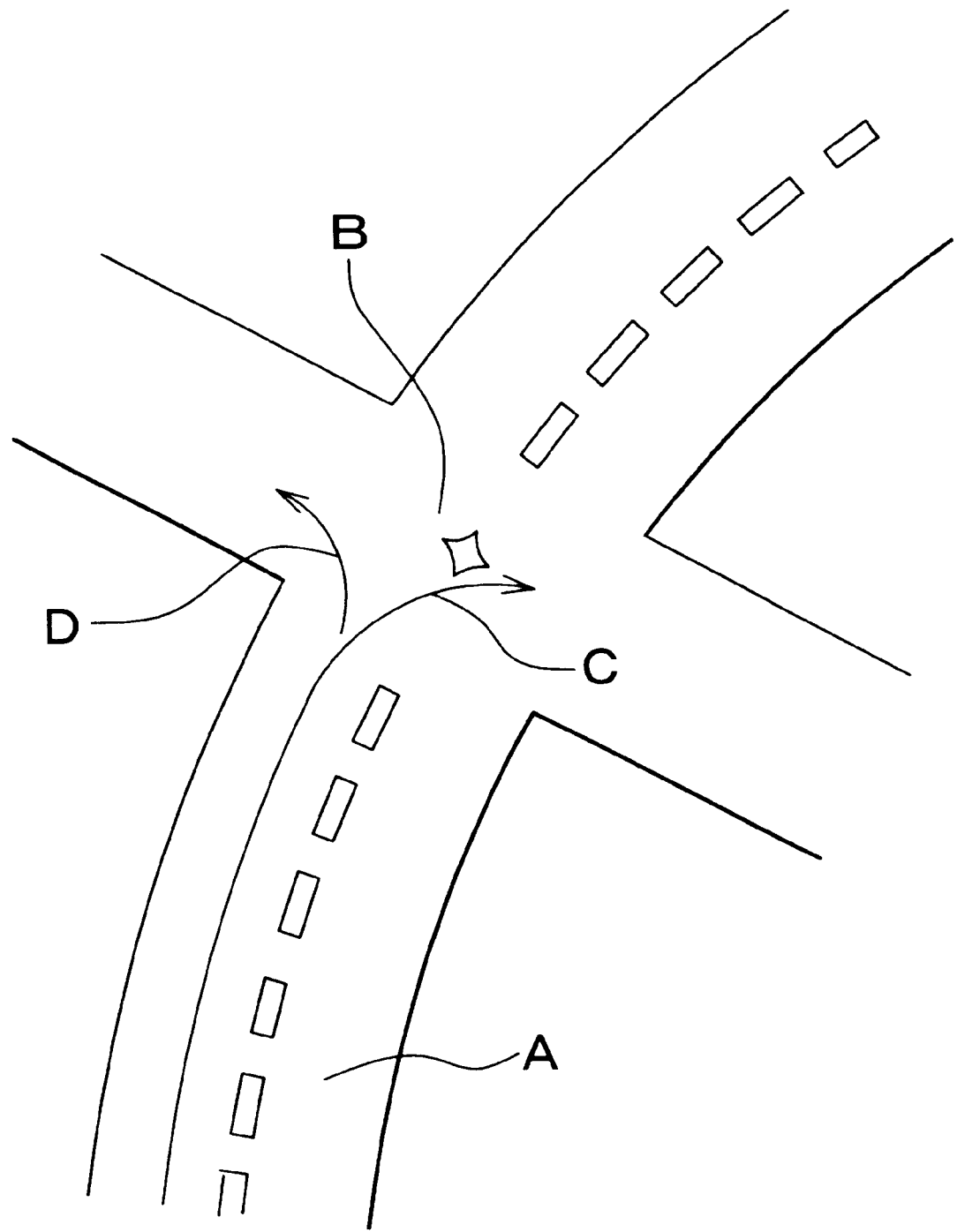
FIG. 3 is an illustrative view of operation of one embodiment of the invention.

The determination step S4 in the flowchart shown in FIG. 2 may be provided if occasion demands.

The invention is applicable not only to scooters but also to all types of two-wheeled vehicles such as motorcycles and even to all types of vehicles including four-wheeled vehicles.

What is claimed is:

1. A turn-signal automatic cancellation apparatus comprising:

a controller for generating a turn signal from a direction indicator lamp based on a direction indicating signal from a turn signal switch;

an angular speed sensor for detecting an angular speed of a vehicle; and a vehicle speed sensor for detecting a speed of the vehicle, wherein the controller calculates a turning angle of the vehicle from the angular speed detected by the angular speed sensor and cancels the turn signal generated from the direction indicator lamp on the condition that the calculated turning angle be equal to or greater than a reference turning angle, that the vehicle speed detected by the vehicle speed sensor be equal to or higher than a reference vehicle speed, and that the angular speed detected by the angular speed sensor be equal to or lower than a reference angular speed.

2. The automatic cancellation apparatus according to claim 1, wherein the reference turning angle is an angle at which the vehicle is regarded as having turned by half.

3. The automatic cancellation apparatus according to claim 2, wherein the reference turning angle is approximately 30 to 40 degrees.

4. The automatic cancellation apparatus according to claim 1, wherein the reference turning angle is a value indicating that the vehicle has begun making a turn.

5. The automatic cancellation apparatus according to claim 4, wherein the reference turning angle is approximately 15 degrees.

6. The automatic cancellation apparatus according to claim 1, wherein the reference vehicle speed is a speed indicating that the vehicle is moving forward.

7. The automatic cancellation apparatus according to claim 6, wherein the reference vehicle speed is approximately 15 to 20 km/h.

8. The automatic cancellation apparatus according to claim 1, wherein the reference angular speed is a value indicating that the vehicle has completed its turn.

9. The automatic cancellation apparatus according to claim 1, wherein the controller calculates a turning angle if the angular speed detected by the angular speed sensor is equal to or higher than a set angular speed.

10. A turn-signal automatic cancellation method comprising the steps of:

detecting an angular speed of a vehicle;

detecting a speed of the vehicle;

calculating a turning angle of the vehicle from the detected angular speed; and canceling a turn signal generated from a direction indicator lamp on the condition that the calculated turning angle be equal to or greater than a reference turning angle, that the vehicle speed detected by the vehicle speed sensor be equal to or higher than a reference vehicle speed, and that the angular speed detected by the angular speed sensor be equal to or lower than a reference angular speed.

11. The automatic cancellation method according to claim 10, wherein the reference turning angle is an angle at which the vehicle is regarded as having turned by half.

12. The automatic cancellation method according to claim 11, wherein the reference turning angle is approximately 30 to 40 degrees.

13. The automatic cancellation method according to claim 10, wherein the reference turning angle is a value indicating that the vehicle has begun making a turn.

14. The automatic cancellation method according to claim 13, wherein the reference turning angle is approximately 15 degrees.

15. The automatic cancellation method according to claim 10, wherein the reference vehicle speed is a speed indicating that the vehicle is moving forward.

16. The automatic cancellation method according to claim 15, wherein the reference vehicle speed is approximately 15 to 20 km/h.

17. The automatic cancellation method according to claim 10, wherein the reference angular speed is a value indicating that the vehicle has completed its turn.

18. The automatic cancellation method according to claim 10, wherein a turning angle is calculated if the angular speed of the vehicle is equal to or higher than a set angular speed.

19. A turn-signal automatic cancellation apparatus comprising:

a turn signal switch;

an angular speed sensor for detecting an angular speed of a vehicle;

a vehicle speed sensor for detecting a speed of the vehicle; and a control circuit for generating a turn signal from a direction indicator lamp based on a direction indicating signal from the turn signal switch, calculating a turning angle of the vehicle from an angular speed detected by the angular speed sensor, and canceling the turn signal generated from the direction indicator lamp on the condition that the calculated turning angle be equal to or greater than a reference turning angle, that the vehicle speed detected by the vehicle speed sensor be equal to or higher than a reference vehicle speed, and that the angular speed detected by the angular speed sensor be equal to or lower than a reference angular speed.

* * * * *